United States Patent [19]

Tawara et al.

[11] Patent Number: 5,118,573
[45] Date of Patent: Jun. 2, 1992

[54] MAGNETO-OPTICAL RECORDING MEDIUM

[75] Inventors: Yoshio Tawara, Fukui; Katsushi Tokunaga, Osaka; Tadao Nomura; Yoshiaki Shimizu, both of Kanagawa; Yoshihiro Kubota; Meguru Kashida, both of Gunma, all of Japan

[73] Assignee: Shin-Etsu Chemical Co., Ltd., Tokyo, Japan

[21] Appl. No.: 601,659

[22] Filed: Oct. 25, 1990

[30] Foreign Application Priority Data

Oct. 26, 1989 [JP] Japan .................. 1-279472
Oct. 26, 1989 [JP] Japan .................. 1-279473
Oct. 26, 1989 [JP] Japan .................. 1-279474
Mar. 16, 1990 [JP] Japan .................. 2-65959

[51] Int. Cl.$^5$ ............................. G11B 5/66
[52] U.S. Cl. .................. 428/694; 428/698; 428/704; 428/900; 427/166; 427/127; 204/192.15
[58] Field of Search ........... 428/694, 698, 704, 900; 427/166, 127; 204/192.1, 192.15

[56] References Cited

U.S. PATENT DOCUMENTS 4,610,912 9/1986 Takahashi et al. .................. 428/694
4,661,520 4/1987 Nakamura et al. .................. 428/694
4,849,304 7/1989 Uchiyama et al. .................. 428/694

FOREIGN PATENT DOCUMENTS 179939 10/1983 Japan .
179940 10/1983 Japan .
2164061 3/1986 Japan .
157347 7/1987 Japan .
000814 1/1988 Japan .
1-85834 7/1989 Japan .

Primary Examiner—Merrell C. Cashion, Jr
Assistant Examiner—Robert J. Follett
Attorney, Agent, or Firm—Wenderoth, Lind & Ponack

[57] ABSTRACT

An improvement is obtained in the stability and recording density of a magneto-optical recording medium having a laminar structure on a transparent substrate plate successively consisting of a first dielectric layer, a magnetic recording layer, a second dielectric layer and a metallic light-reflecting layer by forming the dielectric layer with a unique and specific dielectric material which is an amorphous composite material comprising boron and hydrogen in a specified weight proportion formed by the method of plasma CVD or sputtering. The dielectric material can be a ternary composite of boron, hydrogen and nitrogen or quaternary composite of boron, hydrogen, nitrogen and silicon or carbon.

14 Claims, 1 Drawing Sheet

MAGNETO-OPTICAL RECORDING MEDIUM

BACKGROUND OF THE INVENTION

The present invention relates to a novel magneto-optical recording medium capable of giving a large Kerr rotation angle and a high C/N (carrier-to-noise) ratio by virtue of the high transparency and high refractive index of the dielectric layers to give a very high recording density and stability of the magnetic properties.

Along with the progress of the social activity led by a flood of information, magneto-optical memory devices suitable for erasing and rewriting of information records using a laser beam are high-lighted in recent years. A magneto-optical recording medium generally has a laminar structure, formed in turn on a transparent substrate plate, composed of a first dielectric layer, a magnetic recording layer, a second dielectric layer and a metallic reflecting layer. Conventionally, the magnetic recording layer is formed from an amorphous alloy of a rare earth metal, e.g., terbium, and a transition metal, e.g., iron and cobalt. These conventional rare earth-based amorphous alloys, however, are not quite satisfactory because the Kerr rotation angle thereof is generally not large enough so that the C/N ratio of recording cannot be sufficiently high.

Accordingly, it is a usual practice that a layer of a dielectric material such as silicon monoxide SiO, silicon nitride SiN, aluminum nitride AlN and the like is formed on the surface of the amorphous magnetic recording layer and the thickness of the dielectric layer is controlled to be $\lambda/4$ n, in which $\lambda$ is the wavelength of the laser beam and n is the refractive index of the dielectric material, so as to apparently increase the effective Kerr rotation angle. The improvement obtained by such a means relying on the so-called enhancement effect is still insufficient even by sandwiching the magnetic recording layer with two dielectric layers so that it is eagerly desired to develop a magneto-optical recording medium having a markedly enhanced effective Kerr rotation angle. In this regard, it is an essential requirement that the dielectric material has a refractive index and transparency as high as possible.

Another important problem in the conventional magneto-optical recording media is the relatively low stability of the magnetic properties of the recording layer thereof in the lapse of time, especially, at a high temperature and in a highly humid atmosphere. This disadvantage is presumably due to the high susceptibility of the rare earth metal as a constituent of the magnetic alloy to the attack of the atmospheric oxygen. In this regard, the dielectric layers formed on the magnetic recording layer should desirably serve as a protecting layer against air oxidation while conventional dielectric materials used in the dielectric layers are not always quite effective as a barrier against air oxidation. For example, a layer formed from silicon oxide SiO acts on the rare earth metal rather as an oxidizing agent to oxidize the metal. Other conventional dielectric materials such as silicon nitride and aluminum nitride are of course free from such a problem of oxidation against stability of the magnetic properties but they have another problem of poor mechanical properties to be liable to the formation of cracks in the course of deposition of the layer.

A proposal has been made by M. Asano, et al. in IEEE Trans. Magn., MAG-23, page 2620 (1987) for the use of boron nitride BN as a material of the dielectric layers of a magneto-optical recording medium. This material is indeed excellent in the performance as a dielectric material along with a high refractive index and transparency. Disadvantageously, however, the dielectric layer formed from boron nitride cannot be perfectly amorphous even when it is formed by the method of sputtering and has problems in respects of the homogeneity of the composition and smoothness of the surface along with the relatively low durability.

SUMMARY OF THE INVENTION

The present invention accordingly has an object to provide a novel and improved magneto-optical recording medium free from the above described problems and disadvantages in the conventional magneto-optical recording media by using a unique and specific dielectric material for the dielectric layers.

Thus, the magneto-optical recording medium of the invention has a laminar structure successively consisting of:

(a) a substrate plate made from a material having transparency;

(b) a first dielectric layer formed, on the surface of the substrate plate, from a first dielectric material;

(c) a magnetic recording layer formed, on the first dielectric layer, from an amorphous alloy comprising a rare earth metal;

(d) a second dielectric layer formed, on the surface of the magnetic recording layer, from a second dielectric material; and (e) a light-reflecting layer formed, on the second dielectric layer, from a metal, in which at least one of the first and second dielectric materials is a boron-based amorphous composite comprising boron and hydrogen in such a proportion that the content of hydrogen is in the range from 2 to 30% by weight or, preferably, from 5 to 15% by weight based on the content of boron.

Further, the boron-based amorphous composite as the dielectric material forming the first and/or second dielectric layers can be a ternary composite comprising, in addition to boron and hydrogen, nitrogen in such a proportion that the content of nitrogen is in the range from 10 to 30% by weight based on the content of boron.

In addition to nitrogen, the boron-based amorphous composite as the dielectric material forming the first and/or second dielectric layers can be a quaternary composite comprising, in addition to boron, hydrogen and nitrogen, silicon or carbon each in such a proportion that the content of silicon or carbon is in the range from 0.2 to 50% by weight or from 5 to 50% by weight, respectively, based on the content of boron.

The refractive index of the dielectric layer formed from the above defined dielectric materials can be as large as 1.8 to 2.3 to greatly exceed the refractive indices of conventional dielectric materials used in magneto-optical recording media.

DETAILED DESCRIPTION OF THE PREFERRED EMBODIMENTS

Figure 1:
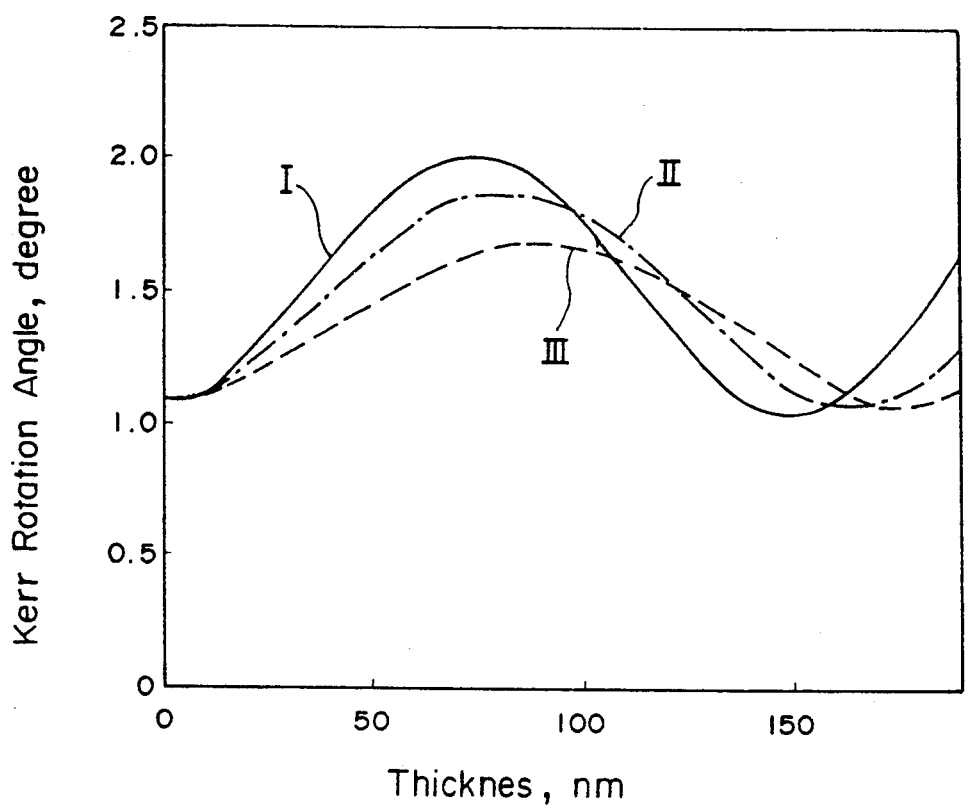
FIG. 1 is a graph showing the Kerr rotation angle $\theta_k$ in the magneto-optical recording medium prepared in Example 19 as a function of the thickness of the first dielectric layer formed from an amorphous composite of boron and hydrogen making comparison with layers formed from boron and nitrogen and silicon and oxygen.

As is understood from the above given description, the most characteristic feature of the inventive magneto-optical recording medium consists in the unique and specific dielectric material forming either one or, preferably, both of the dielectric layers sandwiching the magnetic recording layer. Namely, the dielectric material forming the dielectric layers is a boron-based amorphous composite comprising boron and hydrogen as the essential constituents in a specified weight proportion with optional constituents of the composite including nitrogen, silicon and carbon.

The dielectric layer formed from the above described dielectric material has several advantages that the layer is highly homogeneous having a very smooth surface with almost perfect amorphousness when the layer is formed by the plasma CVD method or sputtering method, that the dielectric layer firmly adheres to the substrate surface or the magnetic recording layer so that the magneto-optical recording medium is freed from the risk of delamination between layers and that the dielectric layer has excellent optical properties including an outstandingly high refractive index of 1.9 or higher as compared with the refractive indices of 1.4 to 1.8 of the conventional dielectric materials and very high transparency in the wavelength range of visible to infrared light to give a great enhancement effect contributing to the improvement of the C/N ratio of recording with a large Kerr rotation angle. In addition, the amorphous composite material forming the dielectric layers of the inventive magneto-optical recording medium has a relatively small thermal conductivity so that the heat energy given spot-wise by the laser beam is freed from the disadvantage of rapid diffusion or dissipation within the layer to give a very small recording bit so that, as a consequence, the recording density on the recording medium can be greatly increased.

The inventive magneto-optical recording medium basically has a laminar structure, as in conventional magneto-optical recording media, formed on a transparent substrate plate. The material forming the substrate plate is not particularly limitative and can be selected from inorganic glassy materials, e.g., soda lime glass and fused quartz glass, and transparent synthetic plastic resins, e.g., polycarbonate and polymethyl methacrylate resins. The substrate plate usually has a thickness in the range from 0.5 to 2.0 mm and is provided with guide grooves for tracking.

The laminar structure formed on the above described transparent substrate plate includes, in turn, a first dielectric layer formed on the surface of the substrate plate, a magnetic recording layer formed on the first dielectric layer, a second dielectric layer formed on the magnetic recording layer and a light-reflecting layer formed on the second dielectric layer. The laser beam incident at the other surface of the substrate plate passes through the first dielectric layer, magnetic recording layer and second dielectric layer and reaches the reflecting layer at which the light is reflected and again passes through the recording layer each time making a recording bit therein.

Although it is not essential that both of the first and second dielectric layers are formed from the same dielectric material, it is advantageous that both of them are formed from the unique and specific amorphous composite material according to the invention. Namely, the most characteristic feature of the inventive magneto-optical recording medium is that the first and/or second dielectric layers are formed from a specific amorphous composite material comprising boron and hydrogen in a specified weight proportion. The layer of such an amorphous composite material can be formed by a known method without particular limitation but conveniently is formed by a CVD (chemical vapor-phase deposition) method or sputtering method.

When the CVD method is undertaken, the substrate plate is placed in a reaction chamber into which gaseous reactants to serve as the boron source and hydrogen source are introduced and are decomposed therein to deposit an amorphous composite comprising boron and hydrogen. The reactant gas to serve as the boron source is exemplified by boron halides such as boron trichloride $BCl_3$ and boron trifluoride $BF_3$ and boron hydrides such as diborane $B_2H_6$. The boron hydride gas serves also as the hydrogen source. When the boron source gas does not contain hydrogen, however, it is necessary that the reactant gas is a mixture of the boron source and a hydrogen source which is a gaseous compound containing hydrogen such as hydrogen gas $H_2$. Preferably, the boron source is diborane in respect of availability and easiness in handling. Diborane can be used as a mixture with hydrogen gas with an object to adequately control the boron-to-hydrogen weight ratio in the resultant amorphous composite layer deposited on the substrate surface. Decomposition of the reactant gas in the chamber is conveniently performed by the so-called plasma CVD method in which the reaction chamber, which can be evacuated to vacuum, is filled with the reactant gas of low pressure and plasma is generated inside the chamber by applying an electric power to the electrodes so that the reactant gas is decomposed and an amorphous composite consisting of boron and hydrogen is deposited on the substrate surface.

The plasma CVD method is particularly advantageous when the substrate has no high heat resistance, as is the case with plastic resin-made substrate plates, because the plasma-induced deposition of the layer can proceed even at a relatively low temperature of 400° C. or below.

Deposition of the dielectric layer made from an amorphous binary composite of boron and hydrogen can be performed also by the sputtering method or, in particular, by the high-frequency sputtering method by using elemental boron as the target and a gaseous mixture of argon and hydrogen as the atmospheric gas filling the sputtering chamber.

The dielectric layer of the binary composite comprising boron and hydrogen deposited in the above described manner should have a thickness in the range from 30 to 120 nm and contain hydrogen in an amount in the range from 2 to 30% by weight or, preferably, from 5 to 15% by weight based on the content of boron. The boron-to-hydrogen weight ratio can be controlled by suitably selecting the conditions in the process of plasma CVD method or sputtering method.

The dielectric layer of the binary amorphous composite of boron and hydrogen has a refractive index in the range from 1.80 to 2.30 when it is deposited under adequate conditions or in the range from 1.90 to 2.15 when it is deposited under more favorable conditions. Namely, the dielectric layer has a considerably larger refractive index than the refractive indices of 1.8 or smaller in conventional dielectric materials used in magneto-optical recording media to give a great enhancement effect which means an apparent increase in the Kerr rotation angle $\theta_k$ as a result of multiple reflection of the laser beam between the interfaces of the layers. A refractive index of the dielectric layer larger than 2.30 is not practical because such a large value of the refractive index can be obtained only at the sacrifice of the mechanical properties and durability of the dielectric layer.

When the first dielectric layer has been completed on the substrate surface in the above described manner, the next step in the preparation of the inventive magneto-optical recording medium is deposition of the magnetic recording layer thereon. The magnetic recording layer is formed from an amorphous alloy composed of a rare earth metal such as terbium, dysprosium, gadolinium, neodymium and the like and a transition metal other than rare earths such as iron, cobalt and nickel. Typically, the magnetic alloy is composed of a combination of metals such as terbium and iron, terbium, iron and cobalt, gadolinium, terbium and iron and gadolinium, dysprosium, iron and cobalt. The magnetic recording layer can be deposited most conveniently by the sputtering method. The magnetic recording layer should have a thickness in the range from 10 to 50 nm.

The step to follow the above described deposition of the magnetic recording layer is deposition of the second dielectric layer thereon. The procedure for this step can be performed in just the same manner as in the deposition of the first dielectric layer so that it is not reiterated here in detail although the composition of the amorphous composite need not be exactly the same as the first dielectric layer. The second dielectric layer also should have a thickness in the range from 20 to 80 nm.

The last step in the preparation of the inventive magneto-optical recording medium is deposition of the metallic light-reflecting layer having a thickness of about 20 to 100 nm by the sputtering method. The metal forming the reflecting layer is selected from aluminum, copper, gold, silver and the like though not particularly limitative thereto.

In the above given description, the amorphous dielectric material forming the first and/or second dielectric layers is a binary composite composed of boron and hydrogen. It is optional when further improvements are desired that the dielectric material is a ternary composite containing nitrogen as the third constituent in addition to boron and hydrogen or a quaternary composite containing nitrogen as the third and silicon or carbon as the fourth constitutent in addition to boron and hydrogen as the essential constituents. When the dielectric layer is formed from these ternary or quaternary amorphous composite, the content of hydrogen is preferably 15% by weight or smaller based on the content of boron.

When the amorphous dielectric layer of the ternary composite composed of boron, hydrogen and nitrogen is deposited by the plasma CVD method, the reactant gas introduced into the plasma chamber must contain a nitrogen source compound such as ammonia and amines in addition to the gases for the boron and hydrogen sources described before in an adequate proportion. When the layer is to be deposited by the sputtering method, the target material can be boron nitride BN or elemental boron and the atmospheric gas should be a mixture of argon and hydrogen with optional addition of nitrogen for the boron nitride target and a mixture of argon, hydrogen and nitrogen for the boron target. The thickness of the dielectric layer in this case is also in the range from 30 to 100 nm. The contents of the hydrogen and nitrogen constituents in the three constituents of boron, hydrogen and nitrogen should preferably be in the ranges of from 5 to 15% by weight and from 10 to 30% by weight, respectively, based on the content of boron. When the dielectric layer of the ternary composite is deposited under adequately controlled conditions, the dielectric layer may have a refractive index in the range from 1.80 to 2.30 or, under more favorable conditions, in the range from 1.90 to 2.15.

When the amorphous dielectric layer is formed from a quaternary composite consisting of boron, hydrogen, nitrogen and silicon and the layer is deposited by the plasma CVD method, the reactant gas must contain a silicon source in addition to the source compounds for the boron, hydrogen and nitrogen constituents described above. Any silicon-containing gaseous compound can be used as the silicon source but it is preferably a silane compound such as silane $SiH_4$, disilane $Si_2H_6$, monomethyl silane $CH_3SiH_3$, dimethyl silane $(CH_3)_2SiH_2$ and the like. Silane and disilane are more preferable. When the dielectric layer is to be deposited by the sputtering method, the target material should be a blend of boron nitride and silicon nitride or an alloy of elemental boron and silicon and the atmospheric gas should be a mixture of argon and hydrogen or argon, hydrogen and nitrogen for the former and a mixture of argon, hydrogen and nitrogen for the latter of the target materials. The thickness of the dielectric layer in this case is also in the range from 30 to 100 nm. The contents of the hydrogen, nitrogen and silicon constituents in the quaternary composite of boron, hydrogen, nitrogen and silicon should preferably be in the ranges of from 5 to 15% by weight, from 10 to 30% by weight and from 0.2 to 50% by weight, respectively, based on the content of boron. When the dielectric layer of the quaternary composite is deposited under adequately controlled conditions, the dielectric layer may have a refractive index in the range from 1.80 to 2.30 or, under more favorable conditions, in the range from 1.90 to 2.15.

When the amorphous dielectric layer is formed from a quaternary composite consisting of boron, hydrogen, nitrogen and carbon and the layer is deposited by the plasma CVD method, the reactant gas must contain a carbon source in addition to the source compounds for the boron, hydrogen and nitrogen constituents described above. Any carbon-containing gaseous compound can be used as the carbon source but it is preferably a hydrocarbon compound such as methane $CH_4$, ethane $C_2H_6$, ethylene $C_2H_4$, acetylene $C_2H_2$, propane $C_3H_8$, propylene $C_3H_6$, benzene $C_6H_6$ and the like. When the dielectric layer is to be deposited by the sputtering method, the target material should be a blend of boron nitride and carbon or a blend of elemental boron and carbon and the atmospheric gas should be a mixture of argon and hydrogen or argon, hydrogen and nitrogen for the former and a mixture of argon, hydrogen and nitrogen for the latter of the target materials. The thickness of the dielectric layer in this case is also in the range from 30 to 100 nm. The contents of the hydrogen, nitrogen and carbon constituents in the quaternary composite of boron, hydrogen, nitrogen and carbon should preferably be in the ranges of from 5 to 15% by weight, from 10 to 30% by weight and from 5 to 50% by weight, respectively, based on the content of boron. When the dielectric layer of the quaternary composite is deposited under adequately controlled conditions, the dielectric layer may have a refractive index in the range from 1.80 to 2.30 or, under more favorable conditions, in the range from 1.90 to 2.15.

In the following, the advantageous properties of the magneto-optical recording medium of the present invention is illustrated in more detail by way of examples although the scope of the invention is never limited thereby in any way.

EXAMPLE 1

A glass plate having a thickness of 1.2 mm as the substrate was placed in a plasma CVD chamber which was filled with a gaseous mixture of diborane and hydrogen gases in a volume ratio of 90:10 under a pressure of 2.5 Torr by the balance of continuous introduction of the gas and evacuation. A high-frequency electric power of 200 watts was applied to the electrodes of the plasma chamber to generate plasma inside the chamber for 2 minutes while the substrate was kept at a temperature of 100° C. so that an amorphous coating layer having a thickness of 100 nm was deposited on the substrate surface. The chemical composition of this coating layer was analyzed by RBS (Rutherford back-scattering spectrometry) and HFS (hydrogen forward-scattering spectrometry) to determine the content of hydrogen relative to the content of boron. The result is shown in the table below in % by weight which also shows the refractive index of and light transmission in % through this coating layer at a wavelength of 633 nm.

EXAMPLE 2

A glass plate as the substrate and a target made of elemental boron were placed in a sputtering chamber which was filled with a gaseous mixture of argon and hydrogen in a volume ratio of 80:20 under a pressure of 0.01 Torr. Sputtering was performed on the substrate surface for 13 minutes by applying a high frequency electric power of 300 watts to the electrodes so that an amorphous coating layer having a thickness of 100 nm was deposited on the surface. The thus formed layer was analyzed in the same manner as in Example 1 for the content of hydrogen relative to boron to give the result shown in the table which also shows the results of the optical measurements of the refractive index of and light transmission through the layer.

EXAMPLE 3

The experimental procedure was substantially the same as in Example 2 except that the atmospheric gas for sputtering was a gaseous mixture of argon and hydrogen in a volume ratio of 90:10 instead of 80:20 to give the results shown in the table.

EXAMPLE 4

An amorphous composite layer having a thickness of 100 nm was deposited on the surface of a glass plate as the substrate by the plasma CVD method in the same manner as in Example 1 except that the reactant gas filling the atmosphere was a mixture of diborane $B_2H_6$ and ammonia $NH_3$ in a volume ratio of 80:20 taking 2 minutes. The thus deposited amorphous layer was analyzed for the contents of boron and nitrogen by ESCA (electron spectroscopy for chemical analysis) and AES (Auger electron spectroscopy) and for the content of hydrogen by RBS and HFS to give the results shown in the table which also shows the results of the optical measurements of the refractive index and light transmission.

EXAMPLE 5

The experimental procedure was substantially the same as in Example 4 except that the volume ratio of the diborane and ammonia in the gaseous mixture for the plasma CVD method was 70:30 instead of 80:20. The contents of hydrogen and nitrogen relative to boron in the thus deposited amorphous composite layer as determined in the same manner as in Example 4 and the results of the optical measurements are shown in the table.

EXAMPLE 6

The experimental procedure was substantially the same as in Example 4 except that the volume ratio of the diborane and ammonia in the gaseous mixture for the plasma CVD method was 85:15 instead of 80:20. The contents of hydrogen and nitrogen relative to boron in the thus deposited amorphous composite layer and the results of the optical measurements are shown in the table.

EXAMPLE 7

An amorphous composite layer having a thickness of 100 nm was deposited on the surface of a glass plate as the substrate by the sputtering method in the same manner as in Example 3 taking 2 minutes except that the target material was boron nitride instead of elemental boron, the atmospheric gas in the sputtering chamber was a mixture of argon, hydrogen and nitrogen in a volume ratio of 80:5:15 and the pressure of the atmosphere was 0.01 Torr. The contents of hydrogen and nitrogen relative to boron in the thus deposited amorphous composite layer as determined in the same manner as in Example 4 and the results of the optical measurements are shown in the table.

EXAMPLE 8

An amorphous composite layer having a thickness of 100 nm was deposited on the surface of a glass plate as the substrate taking 2 minutes by the plasma CVD method in the same manner as in Example 1 except that the reactant gas filling the atmosphere was a mixture of diborane $B_2H_6$, ammonia $NH_3$ and silane $SiH_4$ in a volume ratio of 77:20:3. The thus deposited amorphous layer was analyzed for the contents of boron, nitrogen and silicon by ESCA and AES and for the content of hydrogen by RBS and HFS to give the results shown in the table which also shows the results of the optical measurement for the refractive index of and light transmission through the layer.

EXAMPLE 9

The experimental procedure was substantially the same as in Example 8 except that the volume ratio of the diborane, ammonia and silane in the gaseous mixture for the plasma CVD method was 67:30:3 instead of 77:20:3. The contents of hydrogen, nitrogen and silicon relative to boron in the thus deposited amorphous composite layer and the results of the optical measurements are shown in the table.

EXAMPLE 10

The experimental procedure was substantially the same as in Example 8 except that the volume ratio of the diborane, ammonia and silane in the gaseous mixture for the plasma CVD method was 82:15:3 instead of 77:20:3. The contents of hydrogen, nitrogen and silicon relative to boron in the thus deposited amorphous composite layer and the results of the optical measurements are shown in the table.

EXAMPLE 11

An amorphous composite layer having a thickness of 100 nm was deposited on the surface of a glass plate taking 13 minutes by the sputtering method in the same manner as in Example 3 except that the target material was a mixture of boron nitride and silicon nitride in a weight ratio of 10:1 instead of the elemental boron, the atmospheric gas in the sputtering chamber was a mixture of argon, hydrogen and nitrogen in a volume ratio of 80:5:15 and the pressure of the atmosphere was 0.01 Torr. The contents of hydrogen, nitrogen and silicon relative to boron in the thus deposited amorphous composite layer as determined in the same manner as in Example 8 and the results of the optical measurements are shown in the table.

EXAMPLE 12

An amorphous composite layer having a thickness of 100 nm was deposited on the surface of a glass plate as the substrate by the plasma CVD method taking 2 minutes in the same manner as in Example 1 except that the reactant gas filling the atmosphere was a mixture of diborane $B_2H_6$, ammonia $NH_3$ and methane $CH_4$ in a volume ratio of 77:20:3. The thus deposited amorphous layer was analyzed for the contents of boron, nitrogen and carbon by ESCA and AES and for the content of hydrogen by RBS and HFS to give the results shown in the table which also shows the results of the optical measurements for the refractive index of and light transmission through the layer.

EXAMPLE 13

The experimental procedure was substantially the same as in Example 12 except that the volume ratio of diborane, ammonia and methane in the gaseous mixture for the plasma CVD method was 67:30:3 instead of 77:20:3. The contents of hydrogen, nitrogen and carbon relative to boron in the thus deposited amorphous composite layer and the results of the optical measurements are shown in the table.

EXAMPLE 14

The experimental procedure was substantially the same as in Example 12 except that the volume ratio of diborane, ammonia and methane in the gaseous mixture for the plasma CVD method was 82:15:3. The contents of hydrogen, nitrogen and carbon relative to boron in the thus deposited amorphous composite layer and the results of the optical measurements are shown in the table.

EXAMPLE 15

An amorphous composite layer having a thickness of 100 nm was deposited on the surface of a glass plate as the substrate by the sputtering method taking 13 minutes in the same manner as in Example 3 except that the target material was a mixture of boron nitride and carbon in a weight ratio of 10:1 instead of the elemental boron, the atmospheric gas in the sputtering chamber was a mixture of argon, hydrogen and nitrogen in a volume ratio of 80:5:15 and the pressure of the atmosphere was 0.01 Torr. The contents of hydrogen, nitrogen and carbon relative to boron in the thus deposited amorphous composite layer and the results of the optical measurements are shown in the table.

EXAMPLE 16 (COMPARATIVE)

An amorphous layer of boron nitride having a thickness of 100 nm was deposited by the sputtering method taking 13 minutes in the same manner as in Example 3 except that the target material was boron nitride BN instead of elemental boron and the atmospheric gas was argon. The content of nitrogen relative to boron and the results of the optical measurements are shown in the table.

EXAMPLE 17 (COMPARATIVE)

An amorphous layer of silicon oxide having a thickness of 100 nm was deposited by the sputtering method taking 13 minutes in the same manner as in Example 3 except that the target material was silicon oxide SiO instead of elemental boron and the atmospheric gas was argon. The content of oxygen in the thus deposited layer was 55% by weight based on the content of silicon. The results of the optical measurements are shown in the table.

EXAMPLE 18

The same experimental procedure as in Example 11 was undertaken except that the target was prepared from a mixture of equal amounts by weight of boron nitride and silicon nitride. The contents of hydrogen, nitrogen and silicon relative to boron in the thus deposited amorphous composite layer as determined in the same manner as in Example 8 and the results of the optical measurements are shown in the table.

TABLE

| Example No. | Relative content of element, % by weight (boron = 100%) | | | | Refractive index | Light transmission, % |
| --- | --- | --- | --- | --- | --- | --- |
| | H | N | Si | C | | |
| 1 | 3.8 | — | — | — | 2.03 | 92.7 |
| 2 | 7.8 | — | — | — | 1.96 | 93.5 |
| 3 | 3.2 | — | — | — | 2.15 | 90.1 |
| 4 | 7.9 | 18 | — | — | 1.98 | 91.2 |
| 5 | 6.0 | 24 | — | — | 2.04 | 91.8 |
| 6 | 9.5 | 14 | — | — | 1.93 | 90.3 |
| 7 | 7.0 | 21 | — | — | 2.01 | 91.7 |
| 8 | 7.2 | 19 | 0.7 | — | 2.00 | 92.5 |
| 9 | 6.8 | 25 | 0.9 | — | 2.03 | 93.2 |
| 10 | 8.0 | 13 | 0.5 | — | 1.95 | 91.6 |
| 11 | 7.3 | 20 | 0.7 | — | 1.99 | 92.0 |
| 12 | 8.5 | 18 | — | 15 | 2.00 | 92.6 |
| 13 | 10.2 | 20 | — | .25 | 2.05 | 93.0 |
| 14 | 8.2 | 12 | — | 5.0 | 1.95 | 90.8 |
| 15 | 7.5 | 19 | — | 10 | 2.00 | 91.8 |
| 16 | — | 22 | — | — | 1.94 | 89.8 |
| 17 | — | — | — | — | 1.74 | 86.2 |
| 18 | 6.3 | 17 | 46 | — | 2.04 | 90.3 |

EXAMPLE 19

Magneto-optical recording media were prepared each by successively depositing a first dielectric layer of an amorphous composite consisting of boron and hydrogen, magnetic recording layer, second dielectric layer and light-reflecting layer. The first and the second dielectric layers were deposited by the sputtering method in substantially the same manner as in Example 3 except that the glass substrate was replaced with a substrate of a polycarbonate resin and the length of time for the sputtering was varied so that the first dielectric layers had a varied thickness ranging up to about 200 nm and the second dielectric layer had a thickness of 30 nm in each. The magnetic recording layer, which had a thickness of 20 nm, was deposited by the sputtering method using an alloy of terbium and iron as the target in an atmosphere of argon under a pressure of 0.007 Torr with application of a high-frequency electric power of 300 watts taking 20 minutes. The metallic light reflecting layer, which had a thickness of 40 nm, on top was deposited by the sputtering method taking 8 minutes under the same conditions as in the deposition of the magnetic recording layer except that the target material was aluminum.

Curve I in FIG. 1 of the accompanying drawing is a graphic showing of the Kerr rotation angle $\theta_k$ at a wavelength of 633 nm in the thus prepared magneto-optical recording media as a function of the thickness of the first dielectric layer. Curves II and III of the figure show the comparative data obtained with the magneto-optical recording media prepared in the same manner as above except that the first and the second dielectric layers were deposited by the sputtering method under the same conditions as in Example 16 and 17 for the deposition of amorphous boron nitride and silicon oxide layers, respectively.

As is understood from this figure, the curve I showed a maximum Kerr rotation angle $\theta_k$ of 2.01° when the thickness of the first dielectric layer was about 80 nm satisfying the relationship of $d = \lambda/4\,n$, in which d, $\lambda$ and n are each the thickness of the layer, the wavelength of the laser beam and the refractive index of the layer, respectively, indicating that a quite high enhancement effect could be obtained.

Figure 2:
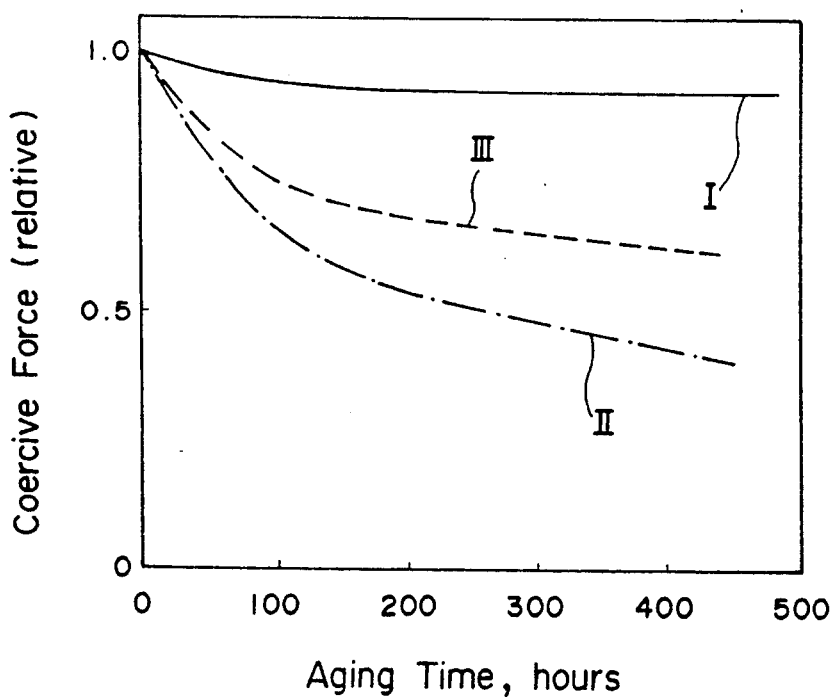
FIG. 2 is a graph showing the relative value of the coercive force of the magnetic layer of the magneto-optical recording medium after accelerated aging test when the dielectric layers are formed from an amorphous composite of boron and hydrogen making comparison with layers formed from boron and nitrogen and silicon and oxygen.

To examine the stability of these magneto-optical recording media in the lapse of time, they were kept in an atmosphere of 85% relative humidity at 85° C. for a length of time up to 500 hours and the coercive force of the magnetic layer was measured relative to the initial value before start of the accelerated aging to give the results shown in FIG. 2, in which the curves I, II and III each correspond to the same magneto-optical recording medium shown by the curves I, II and III, respectively, in FIG. 1, in which the first dielectric layer had a thickness of 80 nm.

As is understood from this figure, the magneto-optical recording medium according to the invention was very stable over 500 hours or longer showing very little decrease in the coercive force while the coercive force in the comparative magneto-optical recording media showed a great decay down to a half or smaller of the initial value.

Substantially the same results as above could be obtained when the dielectric material forming the first and second dielectric layers was the ternary amorphous composite of boron, hydrogen and nitrogen or quaternary amorphous composite of boron, hydrogen, nitrogen and silicon or carbon.

What is claimed is:

1. A magneto-optical recording medium having a laminar structure which consists of:
   (a) a substrate plate made from a material having transparency;
   (b) a first dielectric layer formed, on the surface of the substrate plate, from a first dielectric material;
   (c) a magnetic recording layer formed, on the first dielectric layer, from an amorphous magnetic alloy comprising a rare earth metal;
   (d) a second dielectric layer formed, on the surface of the magnetic recording layer, from a second dielectric material; and
   (e) a light-reflecting layer formed, on the second dielectric layer, from a metal, in which at least one of the first and second dielectric materials is a boron-based amorphous composite comprising boron and hydrogen in such a proportion that the content of hydrogen is in the range from 2 to 30% by weight based on the content of boron.

2. The magneto-optical recording medium as claimed in claim 1 in which the content of hydrogen in the dielectric material is in the range from 5 to 15% by weight based on the content of boron.

3. The magneto-optical recording medium as claimed in claim 2 in which the dielectric material further comprises nitrogen in an amount in the range from 10 to 30% by weight based on the content of boron.

4. The magneto-optical recording medium as claimed in claim 3 in which the dielectric material further comprises silicon in an amount in the range from 0.2 to 50% by weight based on the content of boron.

5. The magneto-optical recording medium as claimed in claim 3 in which the dielectric material further comprises carbon in an amount in the range from 5 to 50% by weight based on the content of boron.

6. The magneto-optical recording medium as claimed in claim 1 in which the first dielectric layer has a thickness in the range from 30 to 120 nm.

7. The magneto-optical recording medium as claimed in claim 1 in which the second dielectric layer has a thickness in the range from 20 to 80 nm.

8. The magneto-optical recording medium as claimed in claim 1 in which the dielectric material has a refractive index in the range from 1.8 to 2.3 at a wavelength of 633 nm.

9. The magneto-optical recording medium as claimed in claim 1 in which the material having transparency forming the substrate plate is an inorganic glassy material.

10. The magneto-optical recording medium as claimed in claim 9 in which the inorganic glassy material is soda lime glass or fused quartz glass.

11. The magneto-optical recording medium as claimed in claim 1 in which the material having transparency forming the substrate plate is a synthetic plastic resin.

12. The magneto-optical recording medium as claimed in claim 11 in which the inorganic glassy material is a polycarbonate resin or polymethyl methaqcrylate resin.

13. A method for the preparation of a magneto-optical recording medium according to claim 1 which comprises forming the dielectric layer by plasma-induced chemical vapor-phase deposition in an atmosphere of a gaseous mixture of diborane and hydrogen.

14. A method for the preparation of a magneto-optical recording medium according to claim 1 which comprises forming the dielectric layer by sputtering with elemental boron as the target in an atmosphere of a gaseous mixture of argon and hydrogen.

* * * * *